United States Patent
Kida et al.

(10) Patent No.: US 6,436,577 B1
(45) Date of Patent: Aug. 20, 2002

(54) NON-AQUEOUS ELECTROLYTIC SECONDARY CELL

(75) Inventors: Yoshinori Kida, Katano; Ryuji Ohshita, Neyagawa; Seiji Yoshimura, Hirakata; Toshiyuki Nohma, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/380,215

(22) PCT Filed: Jun. 8, 1998

(86) PCT No.: PCT/JP98/02541

§ 371 (c)(1), (2), (4) Date: Aug. 26, 1999

(87) PCT Pub. No.: WO98/57386

PCT Pub. Date: Dec. 17, 1998

(30) Foreign Application Priority Data

Jun. 12, 1997 (JP) ................................ 9-155436

(51) Int. Cl.⁷ .......................... H01M 4/58; H01M 4/32; H01M 4/50; H01M 6/16
(52) U.S. Cl. ............................ 429/231.95; 429/218.1; 429/223; 429/224; 429/326
(58) Field of Search ............................ 429/218.1, 231.9, 429/231.95, 223, 229, 326

(56) References Cited

U.S. PATENT DOCUMENTS

| | | | |
|---|---|---|---|
| 5,358,805 A | * 10/1994 | Fujimoto et al. | 429/218 |
| 5,472,808 A | * 12/1995 | Peled et al. | 429/192 |
| 5,478,675 A | 12/1995 | Nagaura | |
| 5,545,468 A | 8/1996 | Koshiba et al. | |
| 5,569,561 A | 10/1996 | Exnar et al. | |
| 5,620,812 A | * 4/1997 | Tahara et al. | 429/223 |
| 5,631,104 A | * 5/1997 | Zhong et al. | 429/194 |
| 5,695,893 A | * 12/1997 | Arai et al. | 429/221 |
| 5,753,387 A | * 5/1998 | Takami et al. | 429/194 |

FOREIGN PATENT DOCUMENTS

| | | |
|---|---|---|
| JP | 7-122298 | 5/1995 |
| JP | 7-335261 | 12/1995 |
| JP | 8-64237 | 3/1996 |
| JP | 8-171937 | 7/1996 |
| JP | 10-27626 | 1/1998 |

OTHER PUBLICATIONS

Handbook of Batteries, 2nd ed. Mc–Graw–Hill, 1995, pp. 3.13 and 3.15.*

N. Koshiba et al., Denki Kagaku, 62,870 (1994), "Evaluation of $Li_{4/3}Ti_{5/3}O_4$ as an Anode of Rechargeable Lithium Cell".*

Patent Abstracts of Japan, vol. 1996, No. 04, Apr. 30, 1996 & JP07–320784, Dec. 8, 1995.

* cited by examiner

Primary Examiner—Stephen Kalafut
Assistant Examiner—Julian A. Marcado
(74) Attorney, Agent, or Firm—Armstrong, Westerman & Hattori, LLP

(57) ABSTRACT

In a non-aqueous electrolyte secondary battery provided with a positive electrode 1, a negative electrode 2, and a non-aqueous electrolyte solution, a lithium-containing composite nickel oxide is used as a chief component of the positive electrode material for the positive electrode, a lithium-containing titanium oxide is used as a chief component of the negative electrode material for the negative electrode, and the solvent of the non-aqueous electrolyte solution contains a cyclic carbonic ester and a chain carbonic ester in such a manner that the cyclic carbonic ester and chain carbonic ester are contained in amounts of not less than 10% by volume of the whole solvent, respectively, and the total content of the cyclic carbonic ester and the chain carbonic ester is not less than 60% by volume of the whole solvent.

8 Claims, 1 Drawing Sheet

NON-AQUEOUS ELECTROLYTIC SECONDARY CELL

TECHNICAL FIELD

The present invention relates generally to a non-aqueous electrolyte secondary battery provided with a positive electrode, a negative electrode, and a non-aqueous electrolyte solution, and more particularly, to a non-aqueous electrolyte secondary battery whose cycle performance is improved when lithium-containing titanium oxide is used as a negative electrode material for its negative electrode.

BACKGROUND ART

In recent years, as one of new-type secondary batteries having high power and high energy density, a high electromotive-force non-aqueous electrolyte secondary battery using a non-aqueous electrolytic solution as an electrolyte and utilizing oxidation and reduction of lithium has been developed. An example of such a non-aqueous electrolyte secondary battery generally utilized is the one employing a lithium-containing composite cobalt oxide as a positive electrode material for its positive electrode and a carbon as a negative electrode material for its negative electrode and having battery voltage of approximately 4 V.

On the other hand, more recently, in accordance with the lowing of operating voltages of IC circuits, the demand has been growing for a battery whose battery voltage is approximately 2.5 V. Such a battery is now being developed.

As such a battery, there has been proposed, as in JP, 7-335261, A, a non-aqueous electrolyte secondary battery such that a lithiated cobalt oxide is used as a positive electrode material for its positive electrode while $Li_{4/3}Ti_{5/3}O_4$ is used as a negative electrode material for its negative electrode, and the cycle performance thereof is improved by setting the ratio of the positive electrode material and the negative electrode material in a proper range.

Unfortunately, however, in the battery disclosed in JP, 7-335261, A, a disadvantage exists that a lithiated cobalt oxide is very expensive. Furthermore, the battery is liable to be overdischarged when a charge/discharge process is performed, whereby the cycle performance is degraded.

The inventors of the present invention have thus examined using a lithium-containing nickel oxide, which is less expensive than a lithium-containing cobalt oxide, as a positive electrode material along with using a lithium-containing titanium oxide as a negative electrode material in a non-aqueous electrolyte secondary battery whose operating voltage is approximately 2.5 V.

However, the inventors of the present invention have discovered some problems in using a lithium-containing nickel oxide as a positive electrode material. For example, charging/discharging efficiency is degraded, and when a charge/discharge process is performed in a case where a lithium-containing titanium oxide is used as a negative electrode material, the battery is liable to be overdischarged, whereby the cycle performance is degraded as in the case of the above-mentioned battery using a lithium-containing cobalt oxide.

An object of the present invention is to solve the above-mentioned problems in a non-aqueous electrolyte secondary battery provided with a positive electrode, a negative electrode, and a non-aqueous electrolyte solution. Specifically, an object of the present invention is to provide a non-aqueous electrolyte secondary battery which is excellent in cycle performance by preventing overdischarge in a case where a lithium-containing titanium oxide is used as a negative electrode material for its negative electrode.

DISCLOSURE OF INVENTION

A first non-aqueous electrolyte secondary battery according to the present invention is a non-aqueous electrolyte secondary battery provided with a positive electrode, a negative electrode, and a non-aqueous electrolyte solution, wherein a lithium-containing composite nickel oxide is used as a chief component of the positive electrode material for the positive electrode, a lithium-containing titanium oxide is used as a chief component of the negative electrode material for the negative electrode, and the solvent of the non-aqueous electrolyte solution contains a cyclic carbonic ester and a chain carbonic ester, the cyclic carbonic ester and chain carbonic ester being contained in amounts of not less than 10% by volume of the whole solvent, respectively, and the total content of the cyclic carbonic ester and the chain carbonic ester being not less than 60% by volume of the whole solvent.

As in the first non-aqueous electrolyte secondary battery according to the present invention, if the solvent contains a cyclic carbonic ester and a chain carbonic ester in amounts of not less than 10% by volume of the whole solvent, respectively, and the total content of the cyclic carbonic ester and the chain carbonic ester is not less than 60% by volume of the whole solvent in the non-aqueous electrolyte secondary battery using a lithium-containing composite nickel oxide as a chief component of the positive electrode material for the positive electrode and a lithium-containing titanium oxide as a chief component of the negative electrode material for the negative electrode, the side reaction that decrease the battery capacity is prevented, whereby cycle performance of the non-aqueous electrolyte secondary battery is improved.

In the first non-aqueous electrolyte secondary battery, the cyclic carbonic ester and the chain carbonic ester are respectively contained in amounts of not less than 10% by volume of the whole solvent because when the amount of the cyclic carbonic ester is less than that, ionic conductivity in the non-aqueous electrolyte solution is reduced, whereby cycle performance is degraded, and when the chain carbonic ester is less than that, the viscosity of the non-aqueous electrolyte solution is made high, whereby ionic conductivity therein is reduced, resulting in the degraded cycle performance.

Further, in the first non-aqueous electrolyte secondary battery, it is preferable to use a lithium-containing composite nickel oxide represented by $LiNi_{1-x}M_xO_2$ (wherein M denotes at least one type of element selected from the group consisting of transition metals, B, Al, Si, and P, and the relationship, $0 \leq x \leq 0.5$, is satisfied) as the positive electrode material in order to prevent the overdischarge in the non-aqueous electrolyte secondary battery, thereby improving cycle performance. Particularly, in order to further prevent the overdischarge, it is preferable that the above-mentioned M is at least one type of element selected from the group consisting of Co, Ti, V, Mn, Fe, Sn, B, Al, Si, and P.

Examples of a lithium-containing composite nickel oxide used as the positive electrode material include $LiNiO_2$, $LiNi_{0.8}Co_{0.2}O_2$, $LiNi_{0.8}Al_{0.2}O_2$, $LiNi_{0.8}Ti_{0.2}O_2$, $LiNi_{0.8}V_{0.2}O_2$, $LiNi_{0.8}Cr_{0.2}O_2$, $LiNi_{0.8}Nn_{0.2}O_2$, $LiNi_{0.8}Fe_{0.2}O_2$, $LiNi_{0.8}Cu_{0.2}O_2$, $LiNi_{0.8}Zn_{0.2}O_2$, $LiNi_{0.8}Nb_{0.2}O_2$, $LiNi_{0.8}Mo_{0.2}O_2$, $LiNi_{0.8}Sn_{0.2}O_2$, $LiNi_{0.8}W_{0.2}O_2$, $LiNi_{0.7}Co_{0.1}Ti_{0.2}O_2$, $LiNi_{0.8}Mn_{0.1}Al_{0.1}O_2$, and the like.

On the other hand, examples of a lithium-containing titanium oxide used as the negative electrode material include $Li_4Ti_5O_{12}$, $Li_3Ti_3O_8$, and the like.

As a cyclic carbonic ester used as the solvent of the non-aqueous electrolyte solution, ethylene carbonate, propylene carbonate, butylene carbonate, and the like can be used. Among these, ethylene carbonate and propylene carbonate are particularly preferred. On the other hand, as a chain carbonic ester, dimethyl carbonate, methyl ethyl carbonate, methyl propyl carbonate, methyl isopropyl carbonate, diethyl carbonate, ethyl propyl carbonate, ethyl isopropyl carbonate, and the like can be used. Among these, dimethyl carbonate, methyl ethyl carbonate, methyl propyl carbonate, and diethyl carbonate are particularly preferred.

Solvents other than the above-mentioned cyclic carbonic ester and chain carbonic ester can also be added to the solvent of the non-aqueous electrolyte solution. Examples of such solvents include 1,2-diethoxyethane, 1,2-dimethoxyethane, and ethoxymethoxyethane and the like, which have been conventionally generally used in non-aqueous electrolyte secondary batteries.

When the total content of the above-mentioned cyclic carbonic ester and chain carbonic ester is not less than 80% by volume of the whole solvent, the side reaction that decrease the battery capacity is further prevented, whereby the cycle performance is further improved.

In the above-mentioned non-aqueous electrolyte solution, as a solute dissolved in the solvent as described above, a known solute which has been conventionally used in a non-aqueous electrolyte secondary battery can be used. Examples of such a solute include lithium compounds such as $LiPF_6$, $LiClO_4$, $LiBF_4$, and $LiCF_3SO_3$. A non-aqueous electrolyte solution obtained by dissolving any one of the above-mentioned solutes in the above-mentioned solvent in the concentration of 0.5 to 1.5 mol/l is generally utilized.

Further, as a separator used to separate the positive electrode and the negative electrode in the first non-aqueous electrolyte secondary battery according to the present invention, a microporous film and unwoven fabric respectively made of polypropylene, polyethylene, or the like, which are conventionally generally utilized, can be used. It is also possible to use as a separator a solid electrolyte using polyethylene oxide, polyvinylidene fluoride, or the like, which is impregnated with the above-mentioned non-aqueous electrolyte solution.

A second non-aqueous electrolyte secondary battery according to the present invention is a non-aqueous electrolyte secondary battery provided with a positive electrode, a negative electrode, and a non-aqueous electrolyte solution, wherein a lithium-containing composite nickel oxide represented by $LiNi_{1-x}Mn_yM_zO_2$ (wherein M denotes at least one type of element selected from the group consisting of Co, Ti, V, Fe, Sn, B, Al, Si, and P, and the relationships, x=y+z, x≦0.6, and 0.05≦y≦0.3, are satisfied) is used as a chief component of the positive electrode material for the positive electrode, a lithium-containing titanium oxide is used as a chief component of the negative electrode material for the negative electrode, and the solvent of the non-aqueous electrolyte solution contains a cyclic carbonic ester in an amount of not less than 10% by volume of the whole solvent.

As in the second non-aqueous electrolyte secondary battery according to the present invention, if the predetermined amount of Mn is contained in the lithium-containing composite nickel oxide and the solvent of the non-aqueous electrolyte solution contains a cyclic carbonic ester in an amount of not less than 10% by volume of the whole solvent, even when an amount of Ni contained in the lithium-containing composite nickel oxide is small, cycle performance is improved as in the case of the above-mentioned first non-aqueous electrolyte secondary battery. In addition, the positive electrode material can be obtained at lower cost as compared with that of the first non-aqueous electrolyte secondary battery.

In the second non-aqueous electrolyte secondary battery, ethylene carbonate, propylene carbonate, butylene carbonate, and the like also can be used as a cyclic carbonic ester used as the solvent of the non-aqueous electrolyte solution. Among these, ethylene carbonate and propylene carbonate are particularly preferred.

In using a cyclic carbonic ester as the solvent of the non-aqueous electrolyte solution, when the solvent of the non-aqueous electrolyte solution contains the cyclic carbonic ester in an amount of 30 to 70% by volume of the whole solvent, the side reaction that decrease the battery capacity is further prevented, whereby the cycle performance is further improved.

MODE FOR CARRYING OUT THE INVENTION

Figure 1:
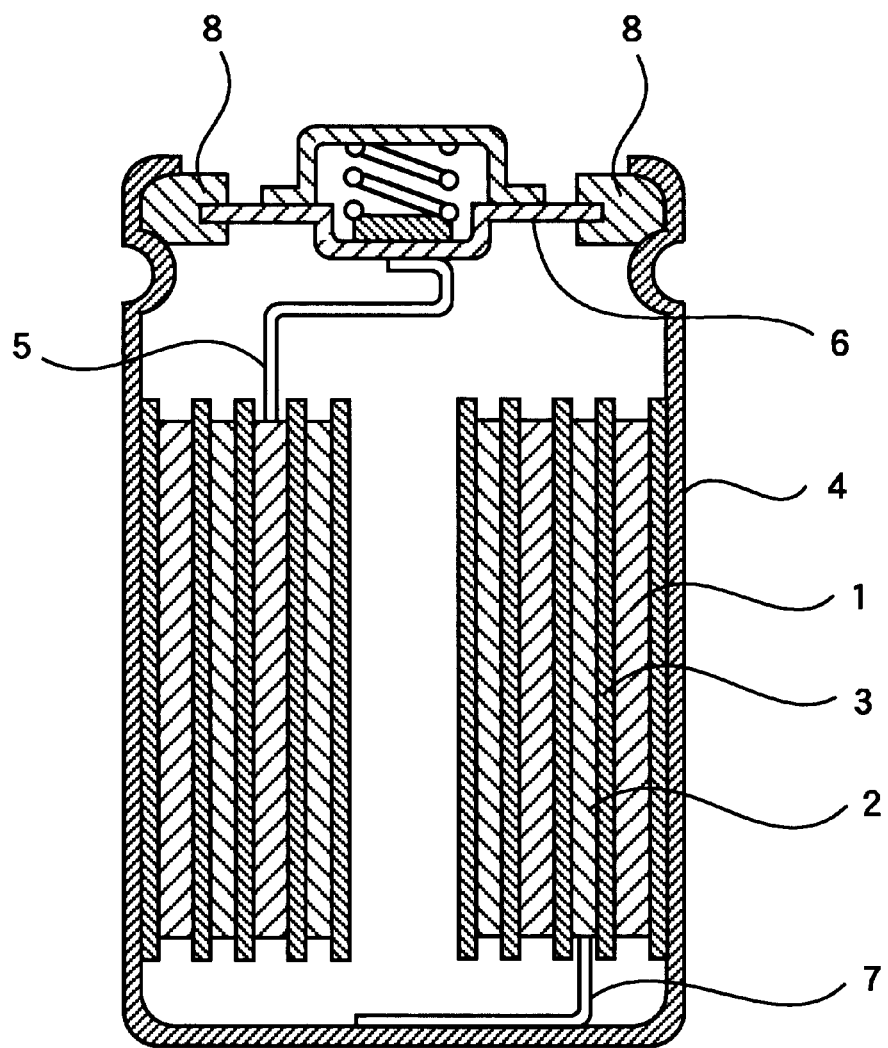
FIG. 1 is a schematic sectional view showing an internal construction of a non-aqueous electrolyte secondary battery prepared in each of examples and comparative examples of the present invention.

A non-aqueous electrolyte secondary battery according to examples of the present invention will be specifically described, and it will be clarified by taking comparative examples that cycle performance is improved in the non-aqueous electrolyte secondary battery in the present examples. The non-aqueous electrolyte secondary battery in the present invention are not particularly limited to those described in the following examples, and can be embodied by being suitably changed within a range in which the gist thereof is not changed.

Examples A1 to A4 and Comparative Examples Q1 to Q3

In each of the examples A1 to A4 and the comparative examples Q1 to Q3, a positive electrode and a negative electrode were produced in the following manner, and a non-aqueous electrolytic solution is prepared in the following manner, to fabricate a cylindrical-type non-aqueous electrolyte secondary battery of AA-size as shown in FIG. 1.

<Production of Positive Electrode>

In producing a positive electrode, $LiNi_{0.8}Co_{0.2}O_2$ was used as a positive electrode material. The positive electrode material $LiNi_{0.8}Co_{0.2}O_2$, artificial carbon as a conductive agent, and polyvinylidene fluoride as a binding agent were mixed in the weight ratio of 90:5:5. N-methyl-2-pyrrolidone (NMP) was added to a mixture obtained, and the mixture was brought into a slurry. Next, the slurry was applied to the both sides of an aluminum foil as a positive-electrode current collector by means of the doctor blade coating method. The slurry on the positive-electrode current collector was then subjected to vacuum drying at temperature of 150° C. for 2 hours, to obtain a positive electrode.

<Production of Negative Electrode>

In producing a negative electrode, $Li_4Ti_5O_{12}$ was used as a negative electrode material. The negative electrode material $Li_4Ti_5O_{12}$, artificial carbon as a conductive agent, and polyvinylidene fluoride as a binding agent were mixed in the weight ratio of 90:5:5. The above-mentioned NMP was added to a mixture obtained, and the mixture was brought into a slurry. Next, the slurry was applied to the both sides of a copper foil as a negative-electrode current collector by means of the doctor blade coating method. The slurry on the negative-electrode current collector was then subjected to vacuum drying at temperature of 150° C. for 2 hours, to obtain a negative electrode.

<Preparation of Non-aqueous Electrolyte Solution>

In preparing a non-aqueous electrolyte solution, a mixed solvent obtained by mixing ethylene carbonate (EC), which is a cyclic carbonic ester, dimethyl carbonate (DMC), which is a chain carbonic ester, and 1,2-dimethoxyethane (DME), which is a solvent other that a cyclic carbonic ester and a chain carbonic ester, in the volume ratio shown in the following Table 1 was used. Lithium hexafluorophosphate $LiPF_6$ was dissolved as a solute in the mixed solvent in the concentration of 1 mol/l, to prepare a non-aqueous electrolytic solution.

<Fabrication of Battery>

In fabricating a non-aqueous electrolyte secondary battery, a porous film made of polypropylene, as a separator 3, was interposed between the positive electrode 1 and the negative electrode 2 produced in the above-mentioned manner, and they were contained in a battery can 4 upon being spirally wound after which the non-aqueous electrolytic solution prepared in the above-mentioned manner was poured in the battery can 4 and the battery can 4 was sealed, and the positive electrode 1 was connected to a positive-electrode outer terminal 6 through a positive-electrode lead 5 and the negative electrode 2 was connected to the battery can 4 through a negative-electrode lead 7, to electrically separate the battery can 4 and the positive electrode outer terminal 6 from each other by an insulating packing 8.

Each of the non-aqueous electrolyte secondary batteries in the examples A1 to A4 and the comparative examples Q1 to Q3 fabricated in the above-mentioned manner was charged at a charging current of 500 mA to a charge cut-off voltage of 2.7 V, and then discharged at a discharge current of 500 mA to a discharge cut-off voltage of 1.2 V. The above-mentioned charging and discharging were considered as one cycle. 200 cycles of charging and discharging were performed, to find the degradation rate of the discharge capacity (the cycle degradation rate) per one cycle until 200th cycle. The results are shown in the following Table 1.

TABLE 1

| | positive electrode material | volume ratio of mixed solvent EC : DMC : DME | cycle degradation rate (%/cycle) |
|---|---|---|---|
| example A1 | $LiNi_{0.8}Co_{0.2}O_2$ | 30 : 30 : 40 | 0.18 |
| example A2 | $LiNi_{0.8}Co_{0.2}O_2$ | 35 : 35 : 30 | 0.17 |
| example A3 | $LiNi_{0.8}Co_{0.2}O_2$ | 40 : 40 : 20 | 0.06 |
| example A4 | $LiNi_{0.8}Co_{0.2}O_2$ | 50 : 50 : 0 | 0.08 |
| comparative example Q1 | $LiNi_{0.8}Co_{0.2}O_2$ | 25 : 25 : 50 | 0.21 |
| comparative example Q2 | $LiNi_{0.8}Co_{0.2}O_2$ | 5 : 75 : 20 | 0.22 |
| comparative example Q3 | $LiNi_{0.8}Co_{0.2}O_2$ | 75 : 5 : 20 | 0.55 |

As apparent from the results, each of the non-aqueous electrolyte secondary batteries in the examples A1 to A4, which employed a mixed solvent in which ethylene carbonate, which is a cyclic carbonic ester, and dimethyl carbonate, which is a chain carbonic ester, were respectively contained in amounts of not less than 10% by volume of the whole solvent, and the total content of the ethylene carbonate and the dimethyl carbonate was not less than 60% by volume of the whole solvent, was lower in the cycle degradation rate and improved in the cycle performance, as compared with each of the non-aqueous electrolyte secondary batteries in the comparative examples Q1 to Q3 which employed a mixed solvent in which the ethylene carbonate and the dimethyl carbonate were contained in the ratio not satisfying the conditions of the present invention.

Further, when the non-aqueous electrolyte secondary batteries in the examples A1 to A4 were compared with each other, it was found that each of the non-aqueous electrolyte secondary batteries in the examples A3 and A4 in which the total content of ethylene carbonate, which is a cyclic carbonic ester, and dimethyl carbonate, which is a chain carbonic ester, was not less than 80% by volume of the whole solvent, was much lower in the cycle degradation rate and further improved in the cycle performance.

Examples B1 to B13 and Comparative Example R1

In each of the examples B1 to B13 and the comparative example R1, a non-aqueous electrolyte secondary battery was fabricated in the same manner as that in the above-mentioned example A3, using a mixed solvent obtained by mixing ethylene carbonate (EC), dimethyl carbonate (DMC), and 1,2-dimethoxyethane (DME) in the volume ratio of 40:40:20 as the solvent in the non-aqueous electrolyte solution, except that only the positive electrode material used in the production of the positive electrode in each of the non-aqueous electrolyte secondary batteries in the examples A1 to A4 and the comparative examples Q1 to Q3 was changed as shown in the following Table 2.

In each of the non-aqueous electrolyte secondary batteries according to the examples B1 to B13 and the comparative example R1 thus fabricated, 200 cycles of charging and discharging were performed in the same manner as that in the above-mentioned case, to find the degradation rate of the discharge capacity (the cycle degradation rate) per one cycle until 200th cycle. The results are also shown in the following Table 2.

TABLE 2

| | positive electrode material | volume ratio of mixed solvent EC : DMC : DME | cycle degradation rate (%/cycle) |
|---|---|---|---|
| example B1 | $LiNiO_2$ | 40 : 40 : 20 | 0.07 |
| example B2 | $LiNi_{0.5}Co_{0.5}O_2$ | 40 : 40 : 20 | 0.07 |
| example B3 | $LiNi_{0.4}Co_{0.6}O_2$ | 40 : 40 : 20 | 0.13 |
| example B4 | $LiNi_{0.8}Ti_{0.2}O_2$ | 40 : 40 : 20 | 0.07 |
| example B5 | $LiNi_{0.8}V_{0.2}O_2$ | 40 : 40 : 20 | 0.08 |
| example B6 | $LiNi_{0.8}Mn_{0.2}O_2$ | 40 : 40 : 20 | 0.07 |
| example B7 | $LiNi_{0.8}Fe_{0.2}O_2$ | 40 : 40 : 20 | 0.08 |
| example B8 | $LiNi_{0.8}Sn_{0.2}O_2$ | 40 : 40 : 20 | 0.07 |
| example B9 | $LiNi_{0.8}B_{0.2}O_2$ | 40 : 40 : 20 | 0.06 |
| example B10 | $LiNi_{0.8}Al_{0.2}O_2$ | 40 : 40 : 20 | 0.06 |
| example B11 | $LiNi_{0.8}Si_{0.2}O_2$ | 40 : 40 : 20 | 0.08 |
| example B12 | $LiNi_{0.8}P_{0.2}O_2$ | 40 : 40 : 20 | 0.07 |
| example B13 | $LiNi_{0.8}Cu_{0.2}O_2$ | 40 : 40 : 20 | 0.12 |
| comparative example R1 | $LiCoO_2$ | 40 : 40 : 20 | 0.24 |

As apparent from the results, each of the non-aqueous electrolyte secondary batteries in the examples B1 to B13 which employed a lithium-containing composite nickel oxide as the positive electrode material was significantly lower in the cycle degradation rate and significantly improved in the cycle performance, as compared with each of the non-aqueous electrolyte secondary battery in the comparative example R1 which employed $LiCoO_2$ containing no nickel as a positive electrode material.

Further, when the non-aqueous electrolyte secondary batteries in the examples B1 to B13 were compared with each other, it was found that each of the non-aqueous electrolyte secondary batteries in the examples B1, B2, B4 to B12 in which the positive electrode material represented by $LiNi_{1-x}M_xO_2$ (wherein M denotes at least one type of element selected from the group consisting of Co, Ti, V, Mn, Fe, Sn, B, Al, Si, and P, and the relationship, $0.05 \leq x \leq 0.5$, is satisfied) was used, was much lower cycle degradation rate and further improved in the cycle performance, as compared with the non-aqueous electrolyte secondary battery in the example B3 in which the above-mentioned x was 0.6, and the non-aqueous electrolyte secondary battery in the example B13 in which Cu was added in addition to the Li and Ni.

Examples C1 to C8

In the examples C1 to C8, non-aqueous electrolyte secondary batteries were fabricated in the same manner as that in the above-mentioned examples A1 to A4 and comparative examples Q1 to Q3, except that only the cyclic carbonic esters and the chain carbonic esters used in the preparation of the non-aqueous electrolyte solutions in the examples A1 to A4 and comparative examples Q1 to Q3 were changed as shown in the following Table 3.

As shown in Table 3, in each of the non-aqueous electrolyte secondary batteries in the examples c1 to c8, the total content of the cyclic carbonic ester and the chain carbonic ester was not less than 80% by volume of the whole solvent, and the cyclic carbonic ester in the solvent was changed to propylene carbonate (PC) in the example C1, the cyclic carbonic ester was changed to EC and PC in the example C2, the chain carbonic ester was changed to methyl ethyl carbonate (MEC) in the example C3, the chain carbonic ester was changed to methyl propyl carbonate (MPrC) in the example C4, the chain carbonic ester was changed to diethyl carbonate (DEC) in the example C5, the chain carbonic ester was changed to DMC and DEC in the example C6, the cyclic carbonic ester was changed to butylene carbonate (BC) in the example C7, and the chain carbonic ester was changed to ethyl propyl carbonate (EPrC) in the example C8.

In each of the non-aqueous electrolyte secondary batteries according to the examples C1 to C8 thus fabricated, 200 cycles of charging and discharging were performed in the same manner as that in the above-mentioned case, to find the degradation rate of the discharge capacity (the cycle degradation rate) per one cycle until 200th cycle. The results are also shown in the following Table 3.

TABLE 3 positive electrode material : $LiNi_{0.8}Co_{0.2}O_2$

| example | type of mixed solvent and volume ratio | cycle degradation rate (%/cycle) |
|---|---|---|
| C1 | PC : DMC : DME = 40 : 40 : 20 | 0.07 |
| C2 | EC : PC : DMC : DME = 20 : 20 : 40 : 20 | 0.06 |
| C3 | EC : MEC : DME = 40 : 40 : 20 | 0.07 |
| C4 | EC : MPrC : DME = 40 : 40 : 20 | 0.08 |
| C5 | EC : DEC : DME = 40 : 40 : 20 | 0.07 |
| C6 | EC : DMC : DEC : DME = 40 : 20 : 20 : 20 | 0.06 |
| C7 | BC : DMC : DME = 40 : 40 : 20 | 0.10 |
| C8 | EC : EPrC : DME = 40 : 40 : 20 | 0.10 |

As a result, each of the non-aqueous electrolyte secondary batteries in the examples C1 to C8 in which a cyclic carbonic ester and a chain carbonic ester used in a solvent was changed was significantly lower in the cycle degradation rate as compared with the above-mentioned non-aqueous electrolyte secondary batteries in the comparative examples Q1 to Q3. The non-aqueous electrolyte secondary batteries which were excellent in cycle performance were obtained in the examples C1 to C8.

Further, when the non-aqueous electrolyte secondary batteries in the examples C1 to C8 were compared with each other, it was found that each of the non-aqueous electrolyte secondary batteries in the examples C1 to C6 which employed ethylene carbonate (EC) and/or propylene carbonate (PC) as a cyclic carbonate, and employed at least one of dimethyl carbonate (DMC), methyl ethyl carbonate (MEC), methyl propyl carbonate (MPrC), and diethyl carbonate (DEC) as the chain carbonate in the solvent of the non-aqueous electrolyte solution was much lower in the cycle degradation rate and further improved in the cycle performance, as compared with the non-aqueous electrolyte secondary battery in the examples C7 which employed butylene carbonate (BC) as a cyclic carbonate, and the non-aqueous electrolyte secondary battery in the examples C8 which employed ethyl propyl carbonate (EprC) as a chain carbonate.

Examples D1 to D5 and Comparative Examples S1 and S2

In the examples D1 to D5 and the comparative examples S1 and S2, non-aqueous electrolyte secondary batteries were fabricated in the same manner as that in the above-mentioned examples A1 to A4 and the comparative examples Q1 to Q3, except that the positive electrode materials used in the production of the positive electrodes in the non-aqueous electrolyte secondary batteries in the examples A1 to A4 and comparative examples Q1 to Q3 were changed to $LiNi_{0.4}Mn_{0.3}Co_{0.3}O_2$ represented by the above-mentioned $LiNi_{1-x}Mn_yM_zO_2$ (wherein M denotes at least one type of element selected from the group consisting of Co, Ti, V, Fe, Sn, B, Al, Si, and P, and the relationships, $x=y+z$, $x \leq 0.6$, and $0.05 \leq y \leq 0.3$, are satisfied) and mixed solvents obtained by mixing ethylene carbonate (EC) and 1,2-dimethoxyethane (DME) in the volume ratio shown in the following Table 4 were used as the solvents of the non-aqueous electrolyte solutions.

Each of the non-aqueous electrolyte secondary batteries in the examples D1 to D5 and the comparative examples S1 and S2 fabricated in the above-mentioned manner was charged at a charging current of 500 mA to a charge cut-off voltage of 2.7 V, and then discharged at a discharge current of 500 mA to a discharge cut-off voltage of 1.2 V. The above-mentioned charging and discharging were considered as one cycle. 100 cycles of charging and discharging were performed, to find the degradation rate of the discharge capacity (the cycle degradation rate) per one cycle until 100th cycle. The results are also shown in the following Table 4.

TABLE 4 positive electrode material : $LiNi_{0.4}Mn_{0.3}Co_{0.3}O_2$

| | volume ratio of mixed solvent EC : DME | cycle degradation rate until 100th cycle (%/cycle) |
|---|---|---|
| example D1 | 10 : 90 | 0.07 |
| example D2 | 30 : 70 | 0.05 |
| example D3 | 50 : 50 | 0.05 |

TABLE 4-continued positive electrode material : LiNi$_{0.4}$Mn$_{0.3}$Co$_{0.3}$O$_2$

| | volume ratio of mixed solvent EC : DME | cycle degradation rate until 100th cycle (%/cycle) |
|---|---|---|
| example D4 | 70 : 30 | 0.05 |
| example D5 | 100 : 0 | 0.08 |
| comparative example S1 | 0 : 100 | 0.34 |
| comparative example S2 | 7 : 93 | 0.29 |

As apparent from the results, each of the non-aqueous electrolyte secondary batteries in the examples D1 to D5 in which LiNi$_{0.4}$Mn$_{0.3}$Co$_{0.3}$O$_2$ was used as the positive electrode material and ethylene carbonate, which is a cyclic carbonic ester, was contained in an amount of not less than 10% by volume of the whole solvent of the non-aqueous electrolyte solution was significantly lower in the cycle degradation rate and significantly improved in the cycle performance, as compared with each of the non-aqueous electrolyte secondary batteries in the comparative examples S1 and S2, in which ethylene carbonate was contained in an amount of less than 10% by volume of the whole solvent.

Further, when the non-aqueous electrolyte secondary batteries in the examples D1 to D5 were compared with each other, it was found that each of the non-aqueous electrolyte secondary batteries in the examples D2 to D4 in which ethylene carbonate, which is a cyclic carbonic ester, was contained in an amount of 30 to 70% by volume of the whole solvent of the non-aqueous electrolyte solution was much lower in the cycle degradation rate and further improved in the cycle performance.

Furthermore, although the ratio of Ni in the positive electrode material was decreased as described above in each of the non-aqueous electrolyte secondary batteries according to the examples D1 to D5, the non-aqueous electrolyte secondary batteries according to the examples D1 to D5 presented the similar effects to those obtained by the non-aqueous electrolyte secondary batteries according to the above-mentioned examples.

In each of the non-aqueous electrolyte secondary batteries according to the examples D1 to D5 and the comparative examples S1 and S2, LiNi$_{0.4}$Mn$_{0.3}$Co$_{0.3}$O$_2$ was used as the positive electrode material. However, the similar effects were obtained when other positive electrode materials represented by LiNi$_{1-x}$Mn$_y$M$_z$O$_2$ (wherein M denotes at least one type of element selected from the group consisting of Co, Ti, V, Fe, Sn, B, Al, Si, and P, and the relationships, x=y+z, x≦0.6, and 0.05≦y≦0.3, are satisfied), LiNi$_{0.5}$Mn$_{0.3}$Co$_{0.2}$O$_2$ and LiNi$_{0.4}$Mn$_{0.1}$Co$_{0.5}$O$_2$ for example, were used. Further, the similar effects were also obtained when propylene carbonate and/or butylene carbonate was used in place of ethylene carbonate as the cyclic carbonate in the solvent of the non-aqueous electrolyte solution.

Examples E1 and E2

In each of the examples E1 and E2, LiNi$_{0.4}$Mn$_{0.3}$Co$_{0.3}$O$_2$ was used as the positive electrode material as in the non-aqueous electrolyte secondary batteries of the above-mentioned examples D1 to D5, while propylene carbonate (PC) and butylene carbonate (BC) were respectively used as the cyclic carbonic esters in the solvents of the non-aqueous electrolyte solutions in the examples E1 and E2 in place of ethylene carbonate (EC), as shown in the following Table 5. Each of these cyclic carbonic esters was respectively mixed with 1,2-dimethoxyethane (DME) in the volume ratio of 50:50 as in the above-mentioned examples D3. Except for the above, the same procedure as in each of the above-mentioned examples D1 to D5 was taken to fabricate non-aqueous electrolyte secondary batteries according to examples E1 and E2.

In each of the non-aqueous electrolyte secondary batteries according to the examples E1 and E2 thus fabricated, 100 cycles of charging and discharging were performed in the same manner as that in the above-mentioned examples D1 to D5, to find the degradation rate of the discharge capacity (the cycle degradation rate) per one cycle until 100th cycle. The results, along with that of the above-mentioned example D3, are shown in the following Table 5.

TABLE 5 positive electrode material : LiNi$_{0.4}$Mn$_{0.3}$Co$_{0.3}$O$_2$

| example | type of mixed solvent and volume ratio | cycle degradation rate until 100th cycle (%/cycle) |
|---|---|---|
| D3 | EC : DME = 50 : 50 | 0.05 |
| E1 | PC : DME = 50 : 50 | 0.05 |
| E2 | BC : DME = 50 : 50 | 0.07 |

As apparent from the results, each of the non-aqueous electrolyte secondary batteries in the examples E1 and E2 in which LiNi$_{0.4}$Mn$_{0.3}$Co$_{0.3}$O$_2$ was used as the positive electrode material and a cyclic carbonic ester is contained in an amount of not less than 10% by volume of the whole solvent of the non-aqueous electrolyte solution was significantly lower in the cycle degradation rate and significantly improved in the cycle performance.

Further, when the non-aqueous electrolyte secondary batteries in the examples D3, E1, and E2 were compared with each other, it was found that each of the non-aqueous electrolyte secondary batteries in the examples D3 and E1 which employed ethylene carbonate or propylene carbonate as a cyclic carbonic ester in the solvent of the non-aqueous electrolyte solution was lower cycle degradation rate and further improved in the cycle performance, as compared with the non-aqueous electrolyte secondary battery in the example E2 which employed butylene carbonate as a cyclic carbonic ester in the solvent of the non-aqueous electrolyte solution.

In each of the non-aqueous electrolyte secondary batteries according to the examples E1 and E2, LiNi$_{0.4}$Mn$_{0.3}$Co$_{0.3}$O$_2$ was used as the positive electrode material. However, the similar effects were obtained when other positive electrode materials represented by LiNi$_{1-x}$Mn$_y$M$_z$O$_2$ (wherein M denotes at least one type of element selected from the group consisting of Co, Ti, V, Fe, Sn, B, Al, Si, and P, and the relationships, x=y+z, x≦0.6, and 0.05≦y≦0.3, are satisfied), LiNi$_{0.5}$Mn$_{0.3}$Co$_{0.2}$O$_2$ and LiNi$_{0.4}$Mn$_{0.1}$Co$_{0.5}$O$_2$ for example, were used.

Examples F1 and F2 and Comparative Examples T1 and T2

In each of the examples F1 and F2 and the comparative examples T1 and T2, a non-aqueous electrolyte secondary battery was fabricated in the same manner as that in the above-mentioned examples D3 using a mixed solvent obtained by mixing ethylene carbonate (EC) and 1,2-dimethoxyethane (DME) in the volume ratio of 50:50, except that the ratio of Mn and Co in $LiNi_{0.4}Mn_{0.3}Co_{0.3}O_2$ used as a positive electrode material in the above-mentioned examples D1 to D5 was changed as shown in the following Table 6 while the ratio of Ni was maintained the same.

In each of the non-aqueous electrolyte secondary batteries according to the examples F1 and F2 and the comparative examples T1 and T2 thus fabricated, 100 cycles of charging and discharging were performed in the same manner as that in the above-mentioned examples D1 to D5, to find the degradation rate of the discharge capacity (the cycle degradation rate) per one cycle until 100th cycle. The results, along with that of the above-mentioned example D3, are shown in the following Table 6.

TABLE 6 mixed solvent EC : DME = 50 : 50

| | positive electrode material | cycle degradation rate until 100th cycle (%/cycle) |
|---|---|---|
| example D3 | $LiNi_{0.4}Mn_{0.3}Co_{0.3}O_2$ | 0.05 |
| example F1 | $LiNi_{0.4}Mn_{0.05}Co_{0.55}O_2$ | 0.06 |
| example F2 | $LiNi_{0.4}Mn_{0.1}Co_{0.5}O_2$ | 0.05 |
| comparative example T1 | $LiNi_{0.4}Mn_{0.03}Co_{0.57}O_2$ | 0.24 |
| comparative example T2 | $LiNi_{0.4}Mn_{0.35}Co_{0.25}O_2$ | 0. 22 |

As apparent from the results, each of the non-aqueous electrolyte secondary batteries in the examples D3, F1, and F2 which employed the positive electrode such that the value of y indicating the ratio of Mn in the above-mentioned $LiNi_{1-x}Mn_yM_zO_2$ was in the range of 0.05 to 0.3 was significantly lower in the cycle degradation rate and significantly improved in the cycle performance, as compared with the non-aqueous electrolyte secondary battery in the comparative example T1 which employed the positive electrode such that the value of the above-mentioned y was 0.03, and the non-aqueous electrolyte secondary battery in the comparative example T2 which employed the positive electrode such that the value of the above-mentioned y was 0.35.

In each of the non-aqueous electrolyte secondary batteries according to the examples F1 and F2 and the comparative examples T1 and T2, a mixed solvent obtained by mixing ethylene carbonate and 1,2-dimethoxyethane in the volume ratio of 50:50 was used as the solvent in the non-aqueous electrolyte solution. However, the similar effects were obtained when the solvent containing the cyclic carbonic ester in an amount of not less than 10% by volume of the whole solvent was used. For example, the same results were obtained when a mixed solvent obtained by mixing propylene carbonate and 1,2-dimethoxyethane in the volume ratio of 40:60 and a mixed solvent obtained by mixing ethylene carbonate, propylene carbonate, and 1,2-dimethoxyethane in the volume ratio of 30:30:40 were used.

Examples G1 and G2 and Comparative Examples U1 to U4

In each of the examples G1 and G2 and the comparative examples U1 to U4, a non-aqueous electrolyte secondary battery was fabricated in the same manner as that in the above-mentioned examples D3, using a mixed solvent obtained by mixing ethylene carbonate (EC) and 1,2-dimethoxyethane (DME) in the volume ratio of 50:50, except that the ratio of Ni, Mn, and Co in $LiNi_{0.4}Mn_{0.3}Co_{0.3}O_2$ used as the positive electrode material in the above-mentioned examples D1 to D5 was changed as shown in the following Table 7.

In each of the non-aqueous electrolyte secondary batteries according to the examples G1 and G2 and the comparative examples U1 to U4 thus fabricated, 100 cycles of charging and discharging were performed in the same manner as that in the above-mentioned examples D1 to D5, to find the degradation rate of the discharge capacity (the cycle degradation rate) per one cycle until 100th cycle. The results, along with those of the above-mentioned examples D3, F1, and F2 are shown in the following Table 7.

TABLE 7 mixed solvent EC : DME = 50 : 50

| | positive electrode material | cycle degradation rate until 100th cycle (%/cycle) |
|---|---|---|
| example D3 | $LiNi_{0.4}Mn_{0.3}Co_{0.3}O_2$ | 0.05 |
| example F1 | $LiNi_{0.4}Mn_{0.05}Co_{0.55}O_2$ | 0.06 |
| example F2 | $LiNi_{0.4}Mn_{0.1}Co_{0.5}O_2$ | 0.05 |
| example G1 | $LiNi_{0.5}Mn_{0.05}Co_{0.45}O_2$ | 0.05 |
| example G2 | $LiNi_{0.5}Mn_{0.3}Co_{0.2}O_2$ | 0.05 |
| comparative example U1 | $LiNi_{0.35}Mn_{0.03}Co_{0.02}O_2$ | 0.26 |
| comparative example U2 | $LiNi_{0.35}Mn_{0.05}Co_{0.6}O_2$ | 0.28 |
| comparative example U3 | $LiNi_{0.35}Mn_{0.3}Co_{0.35}O_2$ | 0.31 |
| comparative example U4 | $LiNi_{0.35}Mn_{0.35}Co_{0.3}O_2$ | 0.32 |

As apparent from the results, each of the non-aqueous electrolyte secondary batteries in the examples D3, F1, F2, G1, and G2 which employed the positive electrode such that the value of (1−x) indicating the ratio of Ni in the above-mentioned $LiNi_{1-x}Mn_yM_zO_2$ was not less than 0.4 and the value of x was thus not more than 0.6 was significantly lower in the cycle degradation rate and significantly improved in the cycle performance, as compared with each of the non-aqueous electrolyte secondary batteries in the comparative examples U1 to U4 which employed the positive electrode such that the value of (1−x) indicating the ratio of Ni in the above-mentioned $LiNi_{1-x}Mn_yM_zO_2$ was 0.35 and the value of x was thus more than 0.6.

In each of the non-aqueous electrolyte secondary batteries according to the examples G1 and G2 and the comparative examples U1 to U4, a mixed solvent obtained by mixing ethylene carbonate and 1,2-dimethoxyethane in the volume ratio of 50:50 was used as the solvent in the non-aqueous electrolyte solution. However, the similar effects were obtained when the solvent containing the cyclic carbonic ester in an amount of not less than 10% by volume of the whole solvent was used. For example, the same results were obtained when a mixed solvent obtained by mixing propylene carbonate and 1,2-dimethoxyethane in the volume ratio of 40:60 and a mixed solvent obtained by mixing ethylene carbonate, propylene carbonate, and 1,2-dimethoxyethane in the volume ratio of 30:30:40 were used.

INDUSTRIAL APPLICABILITY

As described in detail above, in the first non-aqueous electrolyte secondary battery according to the present invention, when a lithium-containing composite nickel oxide is used as a chief component of the positive electrode material for the positive electrode and a lithium-containing titanium oxide is used as a chief component of the negative electrode material for the negative electrode, the solvent of the non-aqueous electrolyte solution contains a cyclic carbonic ester and a chain carbonic ester in amounts of not less than 10% by volume of the whole solvent, respectively, and the total content of the cyclic carbonic ester and the chain carbonic ester is not less than 60% by volume of the whole solvent. Therefore, ionic conductivity in the non-aqueous electrolyte solution is not reduced, and the side reaction that decrease the battery capacity is prevented from being occurred between the solvent of the non-aqueous electrolyte solution and the above-mentioned positive electrode material and negative electrode material. The non-aqueous electrolyte secondary battery which is excellent in cycle performance is thus obtained.

Further, in the second non-aqueous electrolyte secondary battery according to the present invention, when a lithium-containing composite nickel oxide is used as a chief component of the negative electrode material for the negative electrode, a lithium-containing composite nickel oxide represented by $LiNi_{1-x}Mn_yM_zO_2$ (wherein M denotes at least one type of element selected from the group consisting of Co, Ti, V, Fe, Sn, B, Al, Si, and P, and the relationships, x=y+z, x≦0.6, and 0.05≦y≦0.3, are satisfied) is used as a chief component of the positive electrode material for the positive electrode and the cyclic carbonic ester is contained in an amount of not less than 10% by volume of the whole solvent of the non-aqueous electrolyte solution. Therefore, the non-aqueous electrolyte secondary battery which is excellent in cycle performance is obtained as in the case of the first non-aqueous electrolyte secondary battery, and the positive electrode material can be obtained at lower cost as compared with that of the first non-aqueous electrolyte secondary battery by decreasing the amount of the Ni in the lithium-containing composite nickel oxide.

What is claimed is:

1. A non-aqueous electrolyte secondary battery provided with a positive electrode, a negative electrode, and a non-aqueous electrolyte solution, characterized in that a lithium-containing composite nickel oxide represented by $LiNi_{1-x}M_xO_2$ (wherein M denotes at least one type of element selected from the group consisting of Co, Ti, V, Mn, Fe, Sn, B, Al, Si, and P and the relationship, 0≦x≦0.5, is satisfied) is used as a chief component of the positive electrode material for the positive electrode, $Li_4Ti_5O_{12}$ is used as a chief component of the negative electrode material for the negative electrode, and the solvent of the non-aqueous electrolyte solution contains a cyclic carbonic ester and a chain carbonic ester, the cyclic carbonic ester and the chain carbonic ester each being contained in amounts of not less than 10% by volume of the whole solvent, respectively, and the total content of the cyclic carbonic ester and the chain carbonic ester being not less than 60% by volume of the whole solvent, wherein at least one of ethylene carbonate, propylene carbonate, and butylene carbonate is contained as said cyclic carbonic ester while at least one of dimethyl carbonate, methyl ethyl carbonate, methyl propyl carbonate, diethyl carbonate, and ethyl propyl carbonate is contained as said chain carbonic ester; and wherein the charge cut-off voltage thereof is not more than 2.7 V.

2. The non-aqueous electrolyte secondary battery according to claim 1, characterized in that the total content of said cyclic carbonic ester and said chain carbonic ester is not less than 80% by volume of the whole solvent.

3. The non-aqueous electrolyte secondary battery according to claim 2, characterized in that said cyclic carbonic ester contained in the solvent of the non-aqueous electrolyte solution is ethylene carbonate or propylene carbonate while at least one of dimethyl carbonate, methyl ethyl carbonate, methyl propyl carbonate, and diethyl carbonate is contained as said chain carbonic ester.

4. The non-aqueous electrolyte secondary battery according to claim 1, characterized in that said cyclic carbonic ester contained in the solvent of the non-aqueous electrolyte solution is ethylene carbonate or propylene carbonate while at least one of dimethyl carbonate, methyl ethyl carbonate, methyl propyl carbonate, and diethyl carbonate is contained as said chain carbonic ester.

5. A non-aqueous electrolyte secondary battery provided with a positive electrode, a negative electrode, and a non-aqueous electrolyte solution, characterized in that a lithium-containing composite nickel oxide represented by $LiNi_{1-x}Mn_yM_zO_2$ (wherein M denotes at least one type of element selected from the group consisting of Co, Ti, V, Fe, Sn, B, Al, Si, and P, and the relationships, x=y+z, x≦0.6, and 0.05≦y≦0.3, are satisfied) is used as a chief component of the positive electrode material for the positive electrode, $Li_4Ti_5O_{12}$ is used as a chief component of the negative electrode material for the negative electrode, and the solvent of the non-aqueous electrolyte solution contains a cyclic carbonic ester in an amount of not less than 10% by volume of the whole solvent; and wherein the charge cut-off voltage thereof is not more than 2.7 V.

6. The non-aqueous electrolyte secondary battery according to claim 5, characterized in that the solvent of the non-aqueous electrolyte solution contains a cyclic carbonic ester in an amount of 30 to 70% by volume of the whole solvent.

7. The non-aqueous electrolyte secondary battery according to claim 6, characterized in that at least one of ethylene carbonate and propylene carbonate is contained as said cyclic carbonic ester in the solvent of the non-aqueous electrolyte solution.

8. The non-aqueous electrolyte secondary battery according to claim 5, characterized in that at least one of ethylene carbonate and propylene carbonate is contained as said cyclic carbonic ester in the solvent of the non-aqueous electrolyte solution.

* * * * *